Aug. 11, 1964   P. B. MASON ETAL   3,143,941
PHOTOGRAPHIC APPARATUS
Filed Nov. 24, 1961   8 Sheets-Sheet 2

INVENTORS
Paul B. Mason
Leon Cubinstein
and
BY Arthur J. Sable
Brown and Mikulka
ATTORNEYS

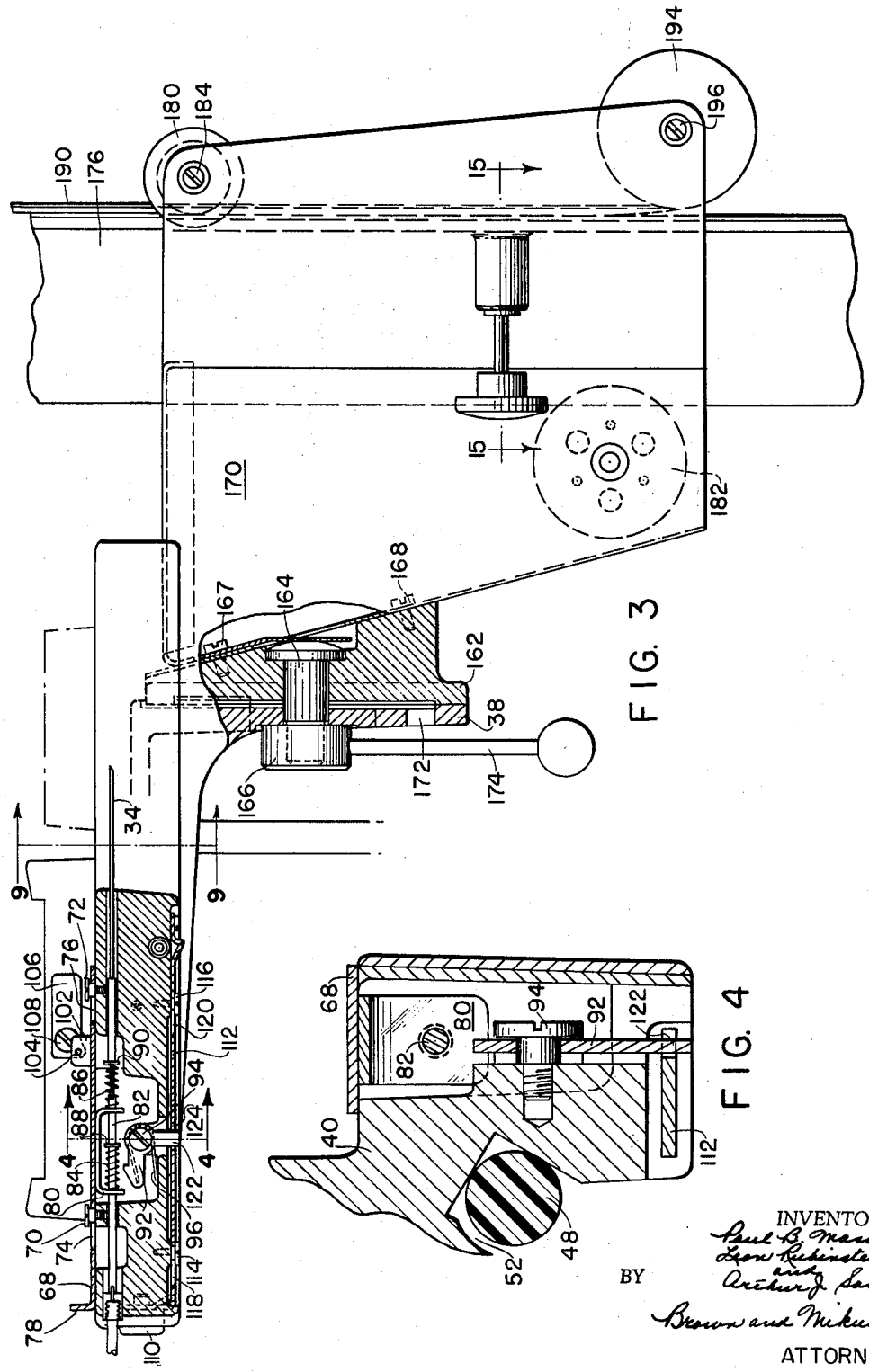

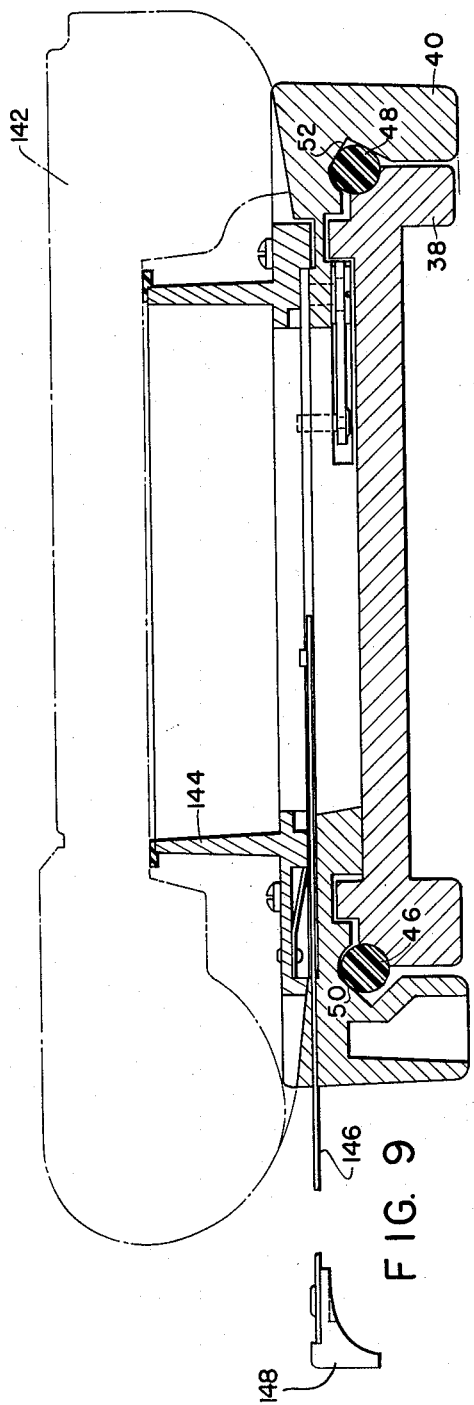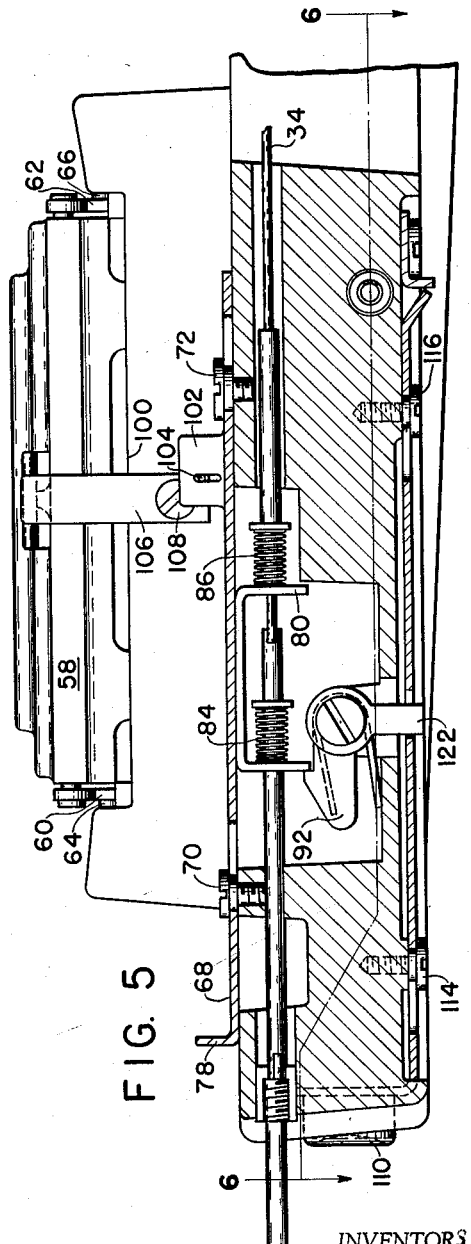

Aug. 11, 1964

P. B. MASON ETAL 3,143,941

PHOTOGRAPHIC APPARATUS

Filed Nov. 24, 1961

INVENTORS
Paul B. Mason
Leon Rubinstein
and
Arthur J. Sable
BY
Brown and Mikulka
ATTORNEYS

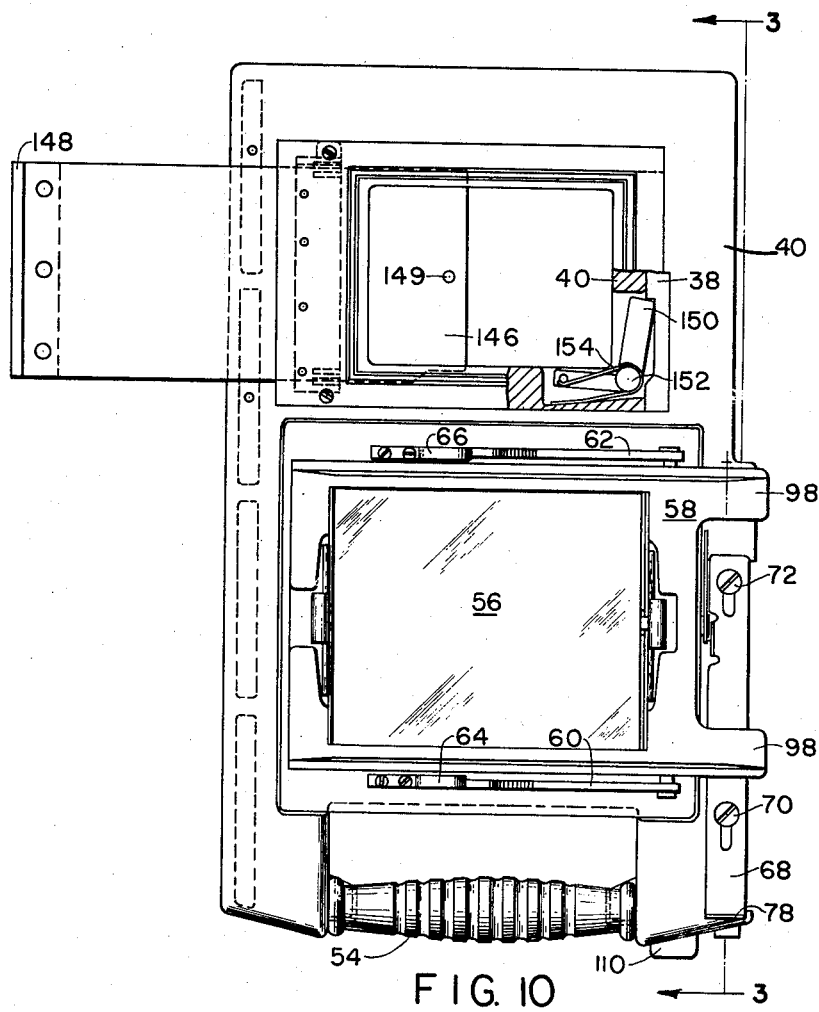

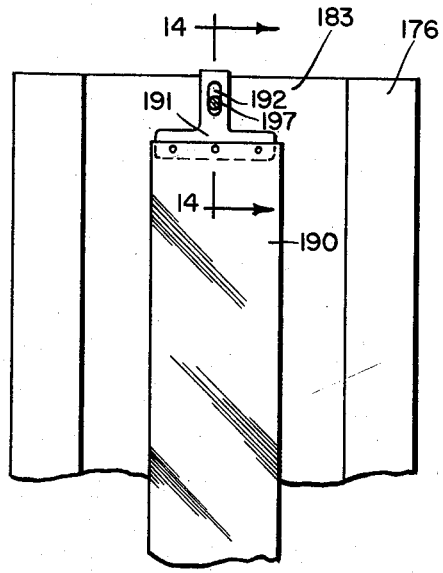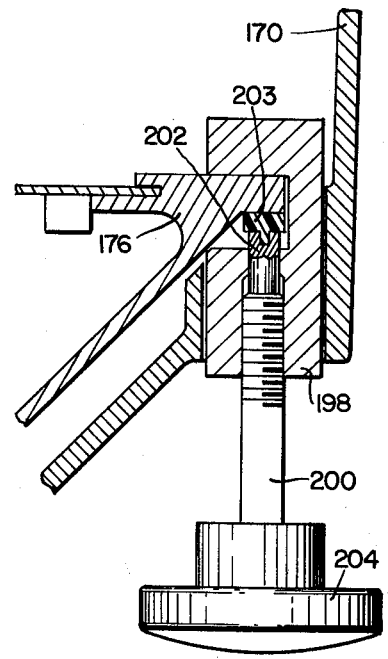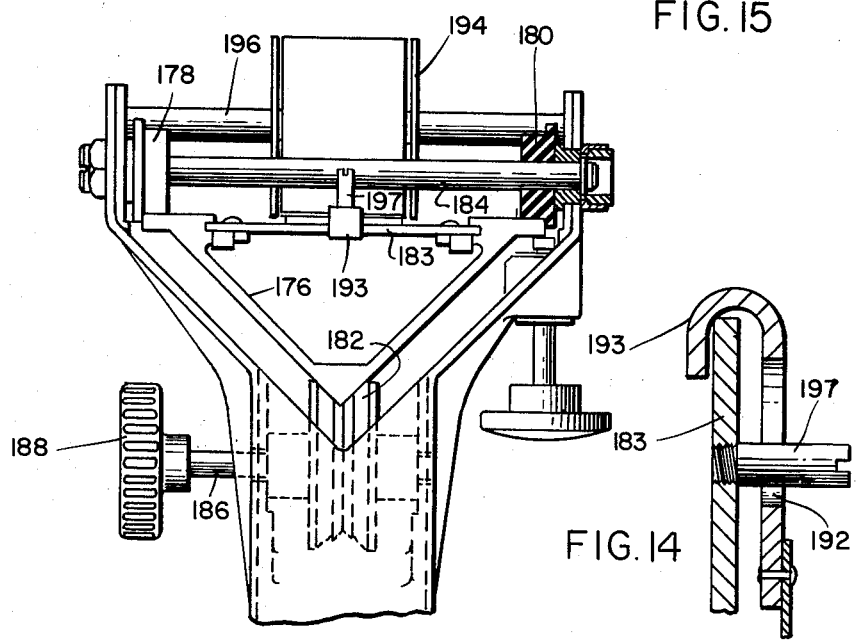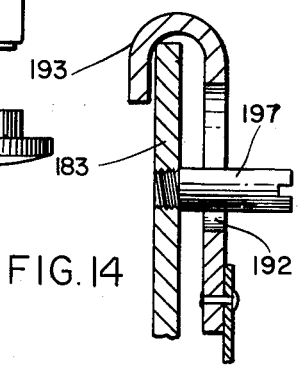

Aug. 11, 1964  P. B. MASON ETAL  3,143,941
PHOTOGRAPHIC APPARATUS
Filed Nov. 24, 1961  8 Sheets-Sheet 8

INVENTORS
Paul B. Mason
Leon Rubinstein
and
Arthur J. Sable
BY
Brown and Mikulka
ATTORNEYS

United States Patent Office 3,143,941
Patented Aug. 11, 1964

3,143,941
PHOTOGRAPHIC APPARATUS
Paul B. Mason, Magnolia, Leon Rubinstein, Natick, and Arthur J. Sable, Boston, Mass., assignors to Polaroid Corporation, Cambridge, Mass., a corporation of Delaware
Filed Nov. 24, 1961, Ser. No. 154,655
16 Claims. (Cl. 95—11)

The present invention relates to photographic apparatus and more specifically to the construction of photograpic cameras and focusing attachments therefor.

Various forms of photographic apparatus are presently known in which a sensitized material holder such as a cut-film holder, film pack adapter or the like, may be inserted between the camera back and a focusing panel holding a translucent screen, such as a ground glass, upon which the object to be photographed has been focused. The object is viewed and focused on the ground glass directly through the camera objective lens by opening the shutter, iris diaphragm, or whatever exposure control means are provided. The shutter is closed after focusing and the film holder is then inserted between the camera back and focusing panel in position for exposure. There is the possibility, however, that after focusing the shutter may inadvertently be left open when the film holder is inserted with the result that the film is accidentally exposed.

Camera constructions are also known wherein an object may be focused on a ground glass or the like mounted on a carrier upon which is also mounted film holding means such as a camera back, film pack holder, or other conventional means. The carrier may be moved to position either the ground glass or the film holding means in registration with the camera exposure aperture. Such arrangements allow convenient and exact focusing through the camera objective and subsequent movement of the photosensitive element into position for exposure by a simple manipulation of the carrier. It is sometimes desirable to mount such apparatus on a stand or pillar, to facilitate copy work, for example.

It is an object of the present invention to provide photographic apparatus wherein a sensitized material holder may be inserted between a focusing panel and camera back, said apparatus including means for preventing such insertion until the camera shutter has been closed after focusing.

A further object is to provide novel photographic apparatus having a carrier movably mounted on a camera back, said carrier having two openings selectively movable into registration with the camera exposure aperture, one of said openings having means for mounting therein a focusing panel under which a cut film holder may be inserted, and the other of said openings having mounted therein a roll film holder.

Other objects are: to provide a photographic camera having a carrier upon which is mounted focusing means and film holding means, wherein a system of interlocks is provided to prevent accidental exposure or fogging of the sensitized materials; to provide a photographic camera having a shutter which may be opened for focusing on a ground glass, a carrier movable between a focusing position, wherein the ground glass is in registration with the camera exposure aperture, and an exposure position wherein a sensitized material holder is in registration with the camera exposure aperture, and means preventing movement of the carrier from the focusing to the exposure position until the shutter has been closed; to provide a photographic camera having a focusing screen and film holding means mounted on a carrier movable between focusing and exposure positions, a light barrier movable between a first position, sealing the interior of the film holding means from actinic light, and a second position, allowing exposure of the film held by said holding means, and means preventing movement of the carrier away from the exposure position until the light barrier has been moved to the first position; and to provide novel means for supporting photographic apparatus which allows precise vertical adjustment thereof on a column, said means being simple and economical in construction as well as highly stable and vibration free.

Other objects of the invention will be in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings where:

FIG. 3 is a fragmentary, side view, partly in section on the line 3—3 of FIG. 10;

FIG. 4 is a fragmentary view in section on the line 4—4 of FIG. 3;

FIG. 5 is a fragmentary view of a portion of FIG. 3, showing certain elements in a secondary position;

FIG. 9 is a front view in section on the line 9—9 of FIG. 3;

FIG. 10 is a top view of a portion of the apparatus, partly broken away;

FIG. 11 is a fragmentary view of a portion of FIG. 10 showing the elements in a second position;

FIG. 12 is a plan view of the supporting and elevating portion of the apparatus;

FIG. 13 is a fragmentary, rear view of a portion of the elements of FIG. 12;

FIG. 14 is a sectional view on the line 14—14 of FIG. 13;

FIG. 15 is a fragmentary, sectional view on the line 15—15 of FIG. 3;

The invention relates generally to improvements in the construction of photographic cameras of the type wherein the object to be photographed is focused on a translucent screen held by a focusing panel, and a sensitized material is moved to the position occupied by the screen during focusing.

This result may be accomplished, according to the present invention, either by inserting film holding means between the focusing panel and the camera back or by mounting both the focusing panel and film holding means on a movable carrier so that movement of the carrier brings the film holding means into the position formerly occupied by the focusing panel, and vice versa. A preferred embodiment of the invention, comprising a camera intended primarily for copy work mounted on a stand or column, is shown in the accompanying drawings and described in detail in the following paragraphs.

It will be noted that the several unique feature of the illustrated embodiment are not confined solely to use with cameras of this type. Although the apparatus shown combines these features with a unitary result, some are equally adapted to be used singly or in combination on other photographic apparatus.

Figure 1:
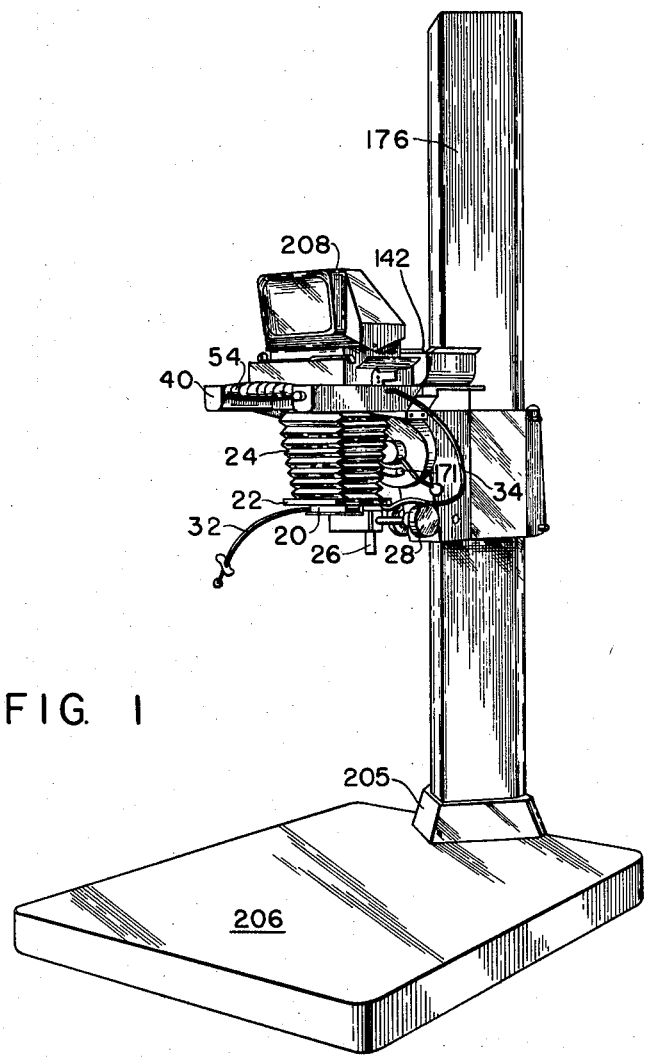
FIGURE 1 is a perspective view of a preferred embodiment of the present invention.

Referring now to the drawings, in FIGURE 1 is seen a perspective view of a preferred embodiment of the apparatus. A conventional shutter mechanism and objective lens (not shown) are contained and supported by housing 20 which is mounted by previously known means on lens-shutter support 22. Support 22 may be operably connected to the camera back by expansible bellows 24, for example, and focusing movement of the objective lens effected by any convenient means previously known in the art, such as rack 26 engaged by a pinion rotatable by turning focusing knob 28. The shutter may comprise any convenient exposure control means, well-known in the art, movable between open and closed positions with respect to the objective lens. The shutter may be tensioned or cocked in a conventional manner and actuated by means of cable release 32. The shutter may be moved to and held in the open position for focusing or for time or "bulb" exposures, by cable release 34 in a manenr to be described later.

Bellows 24 forms a protected optical path from the objective lens to opening 36 in base 38. Mounted for sliding movement on base 38 is carrier 40 which contains two openings 42 and 44, selectively positionable in registration with opening 36. Carrier 40 may be mounted to slide directly on base 38 or, as best seen in FIG. 9, may ride on rods 46 and 48, preferably made of a material with low friction and good wearing characteristics such as nylon, within ways 50 and 52 on the inner side of carrier 40. Handle 54 is provided to be grasped by the operator in sliding carrier 40 on base 38 from the position wherein opening 42 is in registration with opening 36, and hence with the camera objective lens, to the position wherein opening 44 is in registration with opening 36, and vice versa.

As previously mentioned, the camera is intended to be focused by viewing the object to be photographed through the objective lens on means such as a ground glass. This operation is performed with opening 42 in registration with opening 36 and ground glass 56 of focusing panel 58 (FIG. 10) in covering relation to opening 42. Focusing panel 58 is of known design and may be releasably retained in position on carrier 40 by means of spring-biased arms 60 and 62, which are pivotally connected to focusing panel 58 and have end portions terminating in hooks which engage oppositely facing hooks 64 and 66 on either side of opening 42. Arms 60 and 62 may be manually depressed against the spring bias to effect disengagement from hooks 64 and 66. If pictures of different frame size are to taken with the apparatus, such as 4" x 5" in a cut film holder and 3¼" x 4¼" in a roll film camera back, it is also helpful to have framing lines painted, scribed or screened on the ground glass to aid in framing while focusing.

The exposure control means normally blocking the light path through the objective lens must be moved to an open position to allow viewing throug the lens for focusing purposes. Slide 68 is mounted on the upper surface of carrier 40 by means of rivets or screws 70 and 72 which pass through enlongated slots 74 and 76. By pushing upstanding end portion 78, slide 68 may be moved from left to right as viewed in FIG. 3. Movement of slide 68 also causes movement of bracket 80 which is fixedly attached thereto. Rod 82 passes through holes in each end of bracket 80 (FIG. 4). The motion of bracket 80 is transmitted through springs 84 and 86 to E-rings 88 and 90 of rod 82. Cable 34 is movable to open the camera exposure control means, in known manner, by movement of rod 82 from left to right.

Latch 92 is pivotally mounted on carrier 40 by screw 94 and biased in a clockwise direction by spring 96. During the abovedescribed left to right movement of the parts, a portion of bracket 80 overrides latch 92 and is engaged thereby due to the bias of spring 96. The parts are thus retained in the position illustrated in FIG. 5, locking the shutter or other exposure control means in the open position. Thus, the camera is prepared for focusing by pressing upstanding end portion 78 of slide 68. After focusing, the shutter is closed and a sensitized mater holder (not shown) is inserted between focusing panel 58 and carrier 40. This may be accomplished with a variety of previously known plate or cut-film holders, a typical example being that set forth in U.S. Patent 2,933,993, isued April 26, 1960, to A. J. Bachelder et al. The holder may be inserted by lifting upwards on end portion 98 (FIG. 10) of focusing panel 58 and sliding the holder over edge 100 (FIG. 5) into registration with opening 42. The bias on arms 60 and 62, which are retained by hooks 64 and 66, urges both panel 58 and the film holder against carrier 40. After insertion of the holder the sensitized material occupies the position of the ground glass during focusing and is ready to be exposed.

The present invention provides means for preventing insertion of the film holder under the focusing panel until the shutter has been closed after focusing. Slide 68 has an upstanding ear 102 which engages pin 104 of elongated plate 106. Plate 106 is mounted by screw 108 for pivotal movement between the positions illustrated in FIGS. 3 and 5. As slide 68 and the parts associated therewith are moved horizontally to cause the shutter to open, plate 106 is rotated about its pivotal mounting by ear 102 acting on pin 104. When the parts have been locked in the position of FIG. 5, with the shutter open, plate 106 extends across edge 100 and a portion of panel 58, blocking the path of insertion of a plate or film holder. The shutter must be closed, returning the parts to the position of FIG. 3, before the film holder can be placed in position for exposure.

In order to close the shutter, latch 92 must be counterrotated so as to disengage bracket 80. Button 110 on the front of carrier 40 is connected to slide 112 which is mounted by means of screws 114 and 116 which pass through elongated slots 118 and 120, thus providing a reciprocally movable mounting. Arm 122 of latch 92 depends into notch 124 of slide 112. As button 110 is pushed, slide 112 moves from left to right as viewed in FIGS. 3 and 5 and arm 122 is moved, rotating latch 92 in a counter-clockwise direction. Bracket 80 is released and slide 68 with its associated parts is returned to the position of FIG. 3 by the action of springs 84 and 86, as well as the spring normally biasing the shutter toward the closed position. Springs 84 and 86 also provide a resilient override for movement of rod 82, preventing damage to the shutter mechanism in the event that slide 68 is pushed farther than is necessary to open the shutter. Plate 106 no longer interferes with insertion of the film holder, which may now be safely placed in position for exposure.

If the exposure control means provided comprise an iris diaphragm and blade-type shutter, it may also be desirable to provide automatic means for returning the diaphragm to its pre-set opening after it has been fully opened for focusing. This may be accomplished in known manner as on many "pre-set diaphragm" single-lens reflex cameras. A pin or other stop means follows the diaphragm control ring while the aperture is set to the desired opening, for example $f/22$. As the diaphragm is then opened to its largest aperture, for example $f/4.5$, for focusing, the pin remains stationary. The diaphragm and shutter are held in the open position during focusing by suitable latch means. When the latch means are released after focusing, the shutter returns to the closed position and the diaphragm is stopped by the pin at the pre-set opening of $f/22$. The latch means are commonly actuated in reflex cameras by the mirror trip, and in the present camera may be actuated through cable release 34 when button 110 is pushed.

Figure 6:
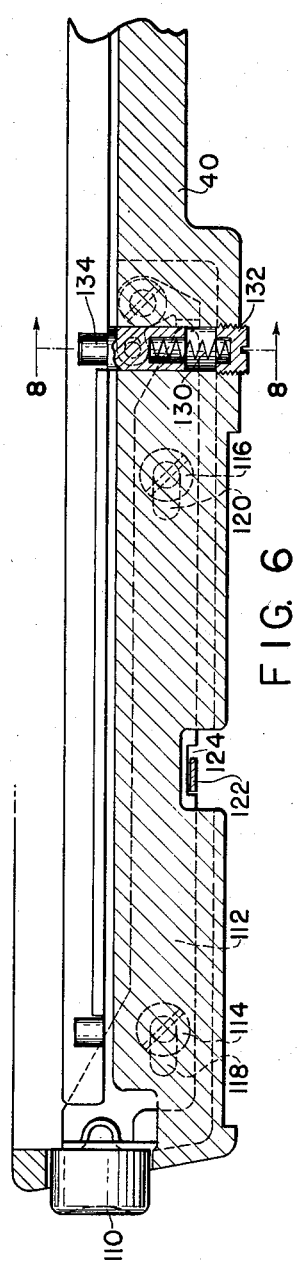
FIG. 6 is a top view in section on the line 6—6 of FIG. 5, showing the elements in a first position.
Figure 7:
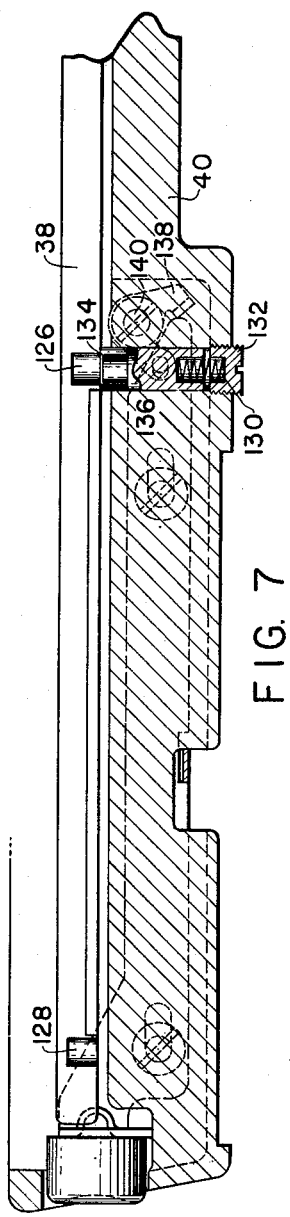
FIG. 7 is a view of the elements of FIG. 6 shown in a second position.
Figure 8:
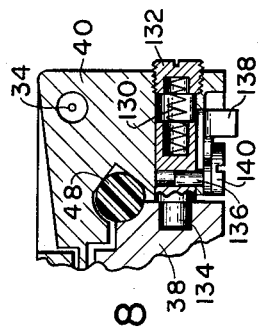
FIG. 8 is a fragmentary, sectional view on the line 8—8 of FIG. 6.

The position of carrier 40 is locked with respect to base 38 when either of openings 42 or 44 are in registration with opening 36 by means of a spring loaded detent on carrier 40 engaging holes in base 38. Referring now to FIGS. 6–8, it will be seen that two holes 126 and 128 are provided in base 38. Spring 130 extends between drilled holes in fixed screw 132 and movable detent 134. Detent 134 is urged by spring 130 into hole 126, when carrier 40 is positioned with opening 42 in registration with opening 36 of base 38, and into hole 128 when carrier 40 is positioned with opening 44 in registration with opening 36. Carrier 40 cannot be moved from one position to the other until detent 134 has been removed from the hole in base 38. Pin 136 extends downwardly from detent 134 to bell crank 138, which is pivotally mounted on carrier 40 by screw 140. When button 110 is pushed, moving slide 112 from the position of FIG. 6 to that of FIG. 7, bell crank 138 is rotated about its pivotal mounting on screw 140, moving pin 136 and removing detent 134 from hole 126. Thus, by pushing button 110 the several operations of closing the shutter, removing the means preventing insertion of a cut-film holder and unlocking the position of carrier 40 on base 38 are accomplished.

Mounted in covering relation to opening 44 is camera back 142, shown in outline in FIG. 9. Camera back 142 provides secondary film holding means, in addition to the cut-film holder intended to be inserted under focusing panel 58, positionable in registration with the camera lens and exposure control system. Camera back 142, as illustrated partially in FIG. 1 and in outline in FIG. 9, comprises a portion of the well-known Polaroid Land camera, as exemplified in U.S. Patents Nos. 2,435,717 and 2,455,111. Although camera back 142 is preferably of the roll-holding type, it is to be understood that it is not limited solely to cameras of the above-mentioned type. As seen in FIG. 9, camera back 142 is mounted on carrier 40 by means of a suitable holder 144 which surrounds opening 44.

In order to make an exposure using the secondary film-holding means, the camera is first focused as previously described with opening 42 in registration with the objective lens and focusing panel 58 mounted as shown in FIG. 5. After focusing, button 110 is pushed to remove detent 134 (also closing the shutter) so that carrier 40 may be moved to position opening 44 and camera back 142 in registration with the objective lens and exposure control system. After such movement, the film held by camera back 142 is ready for exposure in the position occupied by focusing panel 58 during focusing.

In order to insure light tightness of the interior of camera back 142 when it is not positioned in registration with the objective lens and exposure control system, a dark slide or light barrier 146 is provided. Light barrier 146 comprises a substantially rectangular flat sheet of opaque material, such as a non-reflective coated sheet metal, mounted for sliding movement between covering and uncovering positions with respect to the interior of camera back 142. After carrier 40 has been positioned with camera back 142 in exposure position, light barrier 146 is removed from the covering position by grasping projecting edge 148 and sliding light barrier 146 to the left as viewed in FIG. 10, where it is shown in partially uncovering position with camera back 142 removed for a better view of the moving parts. Raised portion 149 may be provided on the surface of light barrier 146 to limit the extent of movement and prevent complete withdrawal thereof.

Before moving carrier 40 away from the position shown in FIG. 10, wherein opening 44 is in registration with the objective lens, light barrier 146 should be returned to the covering position to insure light tightness and prevent possible fogging of the film held by camera back 142. In order to insure that this function is accomplished, an additional interlock is provided. Bell crank 150 is pivotally mounted on screw 152 in a recess in carrier 40. Spring 154 biases bell crank 150 in a clockwise direction as viewed in FIGS. 10 and 11. Pin 156 projects upwardly from bell crank 150 and is contacted by an edge of light barrier 146 when in the covering position. As light barrier 146 is moved away from the covering position, it is removed from contact with pin 156 and bell crank 150 is allowed to rotate until it engages step 158 in base 38, as seen in FIG. 10. Step 158 is adjacent bell crank 150 when carrier 40 is positioned with opening 44 in registration with opening 36. Even though button 110 is pushed, removing detent 134 from hole 128, carrier 40 cannot be moved away from the position of FIG. 10 until bell crank 150 is removed from engagement with step 158. This is accomplished by returning light barrier 146 to the covering position. As this is done, pin 156 is contacted by sloping edge 160 of light barrier 146 and bell crank 150 is urged in a counter-clockwise direction. When light barrier 146 has been returned to the covering position, as in FIG. 11, bell crank 150 has been rotated out of engagement with step 158 and carrier 40 may again be moved relative to base 38.

Figure 16:
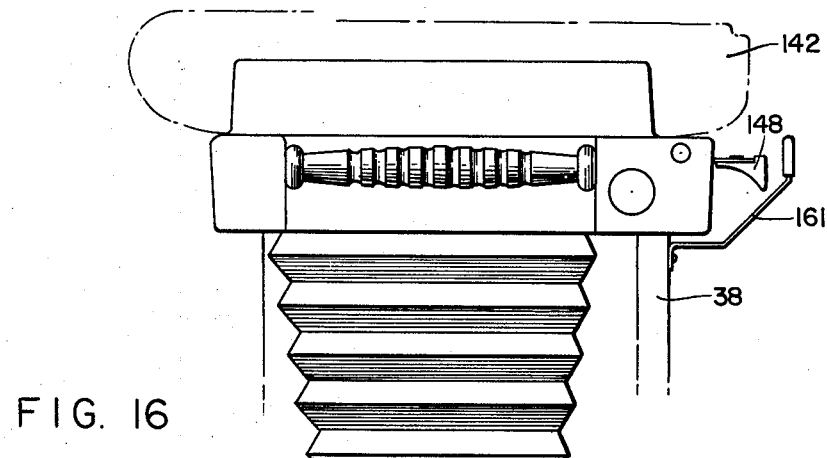
FIG. 16 is a front view of a portion of the apparatus of FIGURE 1, showing an alternate embodiment of certain elements.
Figure 17:
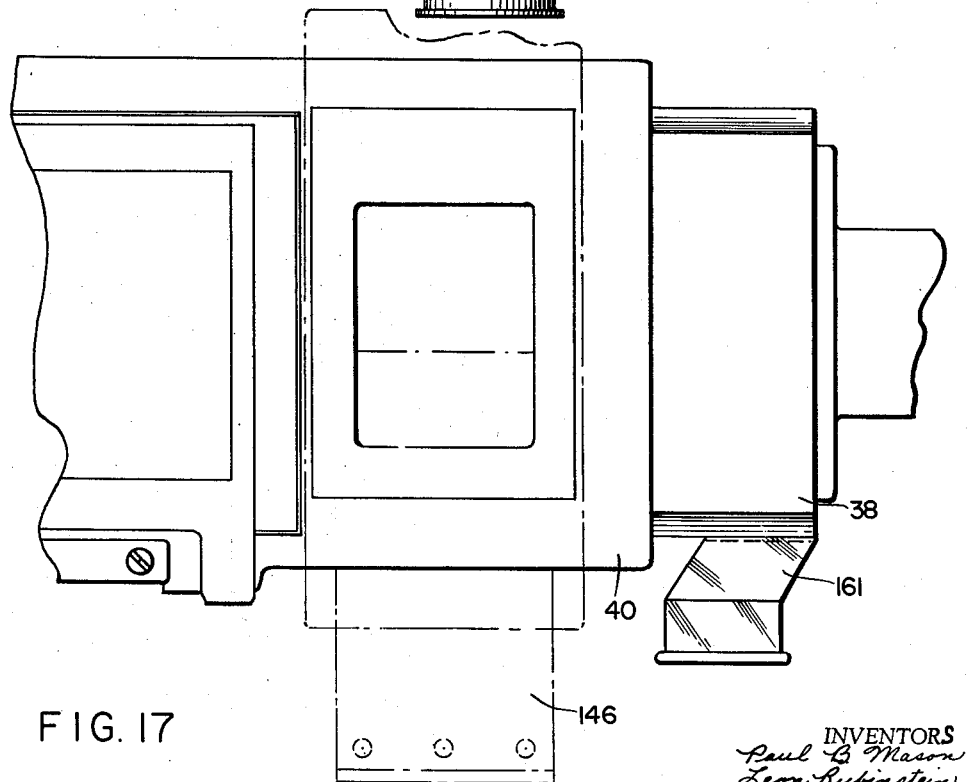
FIG. 17 is a fragmentary, top plan view of the apparatus of FIG. 16.

FIGS. 16 and 17 illustrate an alternate embodiment of an interlock for insuring that light barrier 146 is in covering relation to the photosensitive material held by camera back 142 when not in position for exposure. Light barrier 146 is shown extending from the opposite side of the apparatus from the embodiment illustrated in FIGS. 9 and 10, this feature being immaterial to the function of the device. Member 161 is fixedly attached to base 38 and extends outwardly and upwardly therefrom as seen in FIG. 16. When camera back 142 is not in exposure position, that is, when carrier 40 is in the rearward position on base 38 with opening 42 in registration with opening 36, a portion of member 161 prevents withdrawal of light barrier 146. When carrier 40 is moved to the forward position, placing camera back 142 in position for exposure, as in FIG. 17, light barrier 146 may be withdrawn since member 161 remains stationary during movement of carrier 40. With light barrier 146 withdrawn, a photographic exposure may be made on the film held by camera back 142. Carrier 40 cannot be returned to the rearward position on base 38 until light barrier 146 has been replaced in covering position since member 161 interferes with such movement. This embodiment prevents withdrawal of light barrier 146 with carrier 40 in the rearward position, as well as preventing movement of carrier 40 to the rearward position while light barrier 146 is in uncovering position.

As previously mentioned, the above apparatus may be mounted on a stand or column to facilitate positioning and handling for certain special applications, such as copy work. In the accompanying drawings, with special reference to FIGS. 3 and 12, is seen a preferred embodiment of such a mounting arrangement with means for positioning the camera thereon.

Figure 2:
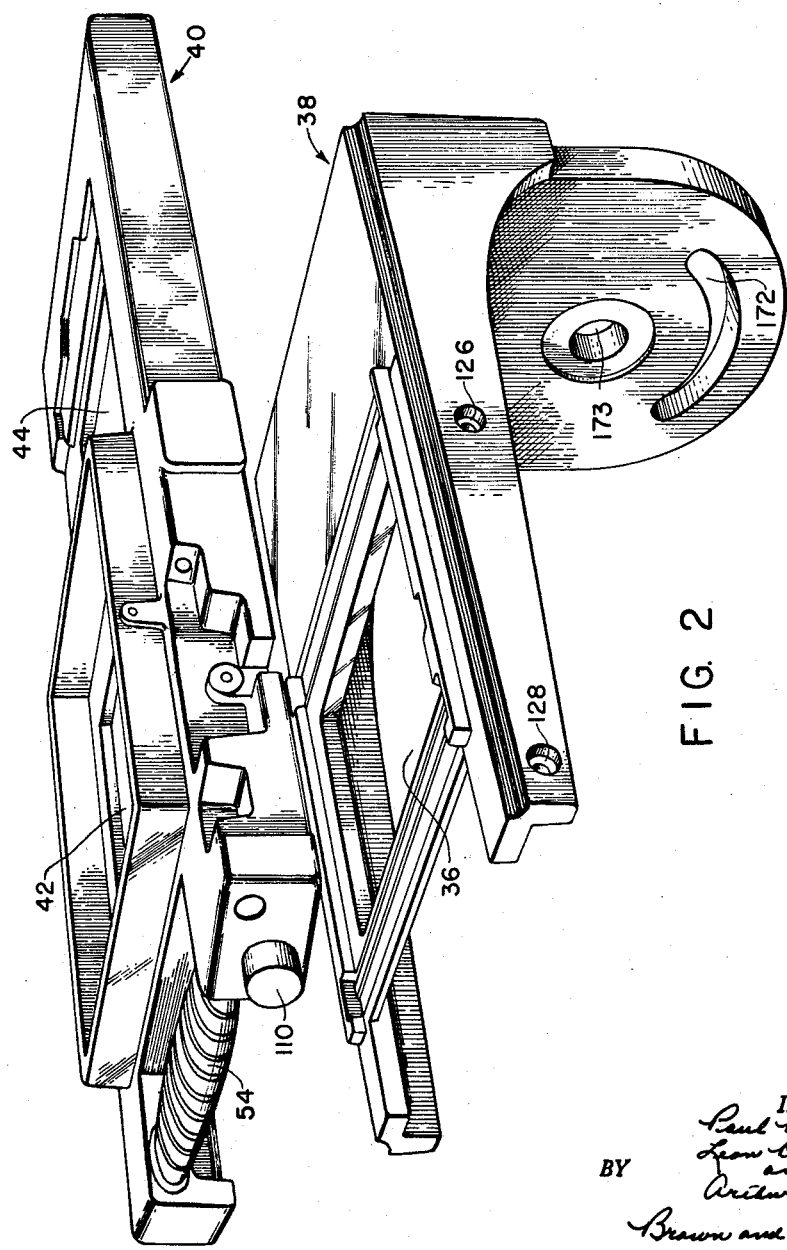
FIG. 2 is an exploded perspective view of certain elements of the apparatus of FIG. 1.

Base 38 is held in engagement with casting 162 by screw 164 and nut 166. Casting 162 is attached by screws 167 and 168 to mounting bracket 170. Fixed stud 171 (FIG. 1) on casting 162 projects through slot 172 in base 38. If nut 166 is loosened, base 38 and the parts mounted thereon may be turned relative to the mounting assembly, screw 164 acting as a pivotal mounting and stud 171 riding in slot 172 to limit the movement. As shown in FIG. 2, slot 172 extends for 90° around opening 173 through which screw 164 projects. Thus, when base 38 is positioned with one end of slot 172 against stud 171, the camera mechanism is vertically positioned, as in FIG. 1, for photographing objects directly below; when the apparatus is rotated so that the other end of slot 172 is against stud 171 the camera is positioned horizontally, exactly at 90° to its former position. Handle 174 provides the necessary leverage for loosening and tightening nut 166.

Also of importance in the manner of mounting the apparatus is the shape of ways 50 and 52 as best seen in cross-section in FIG. 9. It will be noted that rod 48 contacts carrier 40 within way 52 at two points, while rod 46 is in contact with way 50 at only one point. The space provided between rod 46 and the lower side of way 50 allows a slight play as carrier 40 is moved relative to base 38 and prevents binding. Since the upper surface of way 52 is at an angle of substantially less than the upper surface of way 50 with respect to the horizontal, the weight of carrier 40 and the apparatus mounted thereon causes them to tend to slide to the left as viewed in FIG. 10, thus maintaining the horizontal position of the apparatus. As the apparatus is turned 90° to be pointed horizontally, as described in the preceding paragraph, most of the weight of carrier 40 is supported by rod 48. Since the center of gravity of the apparatus is slightly above carrier 40, a counter-clockwise turning moment is created when the camera is pointed horizontally. Carrier 40 is loaded against rod 46 by the turning moment and the position of the apparatus remains stable. If desired, spring loading may be provided between rod 46 and the lower side of way 50 to insure that carrier 40 is biased toward a stable position while still maintaining ample clearance to prevent binding.

Mounting bracket 170 partially surrounds V-shaped column 176, as seen in FIG. 12, and is supported thereon at three points by wheels 178 and 180 on the two rearwardly facing edges and adjusting wheel 182 at the vertex of the V. Means such as plate 183 may be attached in the open side of the column to afford added rigidity. Wheels 178 and 180 are mounted to turn on shaft 184, which passes through each side of bracket 170. Adjusting wheel 182 is mounted on shaft 186 which may be turned by adjusting knob 188. As best seen in FIG. 3, wheels 178 and 180 are mounted near the top of bracket 170 while adjusting wheel 182 is mounted near the bottom on the opposite side of column 176. Thus, the weight of base 38 and the apparatus mounted thereon create a turning moment on bracket 170, tending to turn it counter-clockwise as viewed in FIG. 3, and load adjusting wheel 182 against column 176. At least a portion indicated at 184 in FIG. 12, of adjusting wheel 182 is preferably made of a material having a high coefficient of friction with respect to column 176, such as rubber, thus making the frictional engagement between the two more secure and allowing fine vertical adjustment of the apparatus by turning knob 188.

In order to help support the weight of the apparatus and facilitate vertical positioning, constant force spring 190 is provided. Spring 190, preferably formed of a flexible strip of metal, is attached at one end to member 191 which includes slot 192 and terminates in hook 193. The other end of spring 190 is attached to drum 194 which rotates on shaft 196 mounted near the bottom of bracket 170. Hook 193 is engaged over the top of plate 183, thereby fixing the position of the upper end of spring 190. Screw 197 passes through slot 192 and is secured in plate 183. The diameter of screw 197 is approximately equal to the width of slot 192, thus preventing horizontal movement of member 191 and spring 190. The distance between the bottom of screw 197 and the bottom of slot 192 is less than the length of hook 193. Consequently, hook 193 cannot be disengaged from plate 183 unless screw 197 has been removed. The length of screw 197 when fully engaged is such that it projects outwardly from plate 183 far enough to be contacted by shaft 184 when the apparatus is raised. Screw 197 thus performs the triple function of securing member 191 to plate 183, preventing horizontal movement of member 191 and spring 190, and acting as a vertical stop. Thus, as the apparatus is raised and lowered on column 176, spring 190 winds and unwinds from drum 194, exerting an upward force on the apparatus.

A clamp assembly comprising cylindrical block 198, which fits through an opening in bracket 170, screw 200 and pin 202, provides means for fixing the vertical position of the apparatus on column 176. As knob 204 is turned, screw 200 is advanced through the threaded hole in block 198, forcing nylon pad 203 which is affixed to the end of pin 202, against column 176. A portion of column 176 is thereby engaged between pad 203 and the cut-out portion of block 198, as seen in FIG. 15 and the position of bracket 170 and the apparatus mounted thereon is fixed with respect to column 176. Since block 198 is not fixedly attached to bracket 170, the tightening of the clamp assembly does not exert a twisting force on bracket 170 or any of the rest of the apparatus.

To change and adjust the vertical position of the apparatus mounted on column 176, the operator loosens the clamping assembly by turning knob 204. The apparatus is then raised or lowered to the approximate desired position, spring 190 helping to support the weight of the apparatus. Fine adjustment is made by turning knob 188 to bring the apparatus to the exact vertical position. The position is then fixed by turning knob 204 to tighten the clamping assembly. A turning moment is exerted on mounting bracket 170 by the apparatus extending therefrom away from column 176. Therefore, the weight of the apparatus loads adjusting wheel 182 against column 176, providing positive three-point suspension where column 176 is contacted by wheels 178, 180 and 182. The shape of column 176 provides a rigid structure, suitable for mounting apparatus thereon in the above-described manner, which may be economically fabricated, as for example by extrusion.

Column 176 may be supported by a suitable engagement member 205 on a flat working surface 206 on which the object to be photographed is placed. The object may be illuminated by a suitable lighting arrangement (not shown) attached to surface 206 or separate therefrom. A focusing hood 208 (FIG. 1) may be placed over the ground glass to reflect the image to the eye of the operator when the apparatus is too high on column 176 to be conveniently viewed from above.

Since certain changes may be made in the above apparatus without departing from the scope of the invention herein involved, it is intended that all matter contained in the above description (or shown in the accompanying drawings) shall be interpreted as illustrative and not in a limiting sense.

What is claimed is:
1. Photographic apparatus comprising, in combination:
  (a) a camera back having a first opening therein;
  (b) a carrier having second and third openings therein and mounted upon said back for movement between a first position, wherein said second opening is in registration with said first opening, and a second position, wherein said third opening is in registration with said first opening;
  (c) means for mounting a first sensitized material holder in covering relation to said second opening;
  (d) means for mounting a second sensitized material holder in covering relation to said third opening;
  (e) a light barrier movable between open and closed positions with respect to said first opening;
  (f) means preventing mounting of said first sensitized material holder while said carrier is in said first position and said light barrier is in said open position; and
  (g) means preventing movement of said carrier away from said first position while said light barrier is in said open position.

2. The invention according to claim 1 wherein said light barrier comprises a camera shutter mechanism.

3. Photographic apparatus comprising, in combination:
  (a) a camera back having a first opening therein;

(b) a carrier having a second opening therein and mounted upon said back for movement between a first position, wherein said second opening is not in registration with said first opening, and a second position, wherein said second opening is in registration with said first opening;

(c) means for mounting a sensitized material holder in covering relation to said second opening;

(d) a light barrier movable between open and closed positions with respect to said first opening;

(e) engaging means for releasably locking said carrier in said first and second positions;

(f) release means manually movable to unlock said engaging means to allow movement of said carrier; and (g) means for so connecting said release means and said light barrier that the latter is moved to its closed position in response to movement of said release means to unlock said engaging means.

4. The invention according to claim 3 wherein said light barrier comprises a camera shutter mechanism.

5. Photographic apparatus comprising, in combination:

(a) a camera back having an opening therein;

(b) means for mounting in covering relation to said opening a focusing panel of the type movable away from said opening to allow insertion of a sensitized material holder between said focusing panel and said camera back;

(c) a light barrier movable between open and closed positions with respect to said opening; and (d) means movable to an operative position blocking said insertion of said sensitized material holder in response to movement of said light barrier to said open position.

6. The invention according to claim 5 wherein said light barrier comprises a camera shutter mechanism.

7. Photographic apparatus comprising, in combination:

(a) a camera back having an opening therein;

(b) means for mounting in convering relation to said opening a focusing panel of the type movable away from said opening to allow insertion of a sensitized material holder between said focusing panel and said camera back;

(c) an objective lens operably connected to said camera back in registration with said opening;

(d) exposure control means movable between covering and uncovering positions with respect to said lens;

(e) coupling means movable between first and second positions and operably connected to said exposure control means whereby, when said coupling means is moved to said first position said exposure control means is moved to said uncovering position and when said coupling means is moved to said second position said exposure control means is moved to said covering position;

(f) interlock means movable to an operative position in response to movement of said coupling means to said first position and to an inoperative position in response to movement of said coupling means to said second position; and (g) said interlock means being so constructed and arranged relative to said camera back and focusing panel that when said interlock means is in said operative position it prevents said insertion of said sensitized material holder.

8. A photographic apparatus comprising, in combination:

(a) a camera back having a first opening;

(b) a carrier having a second opening therein and mounted upon said back for movement between a first position, wherein said second opening is in registration wtih said first opening, and a second position, wherein said second opening is not in registration with said first opening;

(c) means for mounting a sensitized material holder in covering relation to said second opening;

(d) an objective lens operably connected to said camera back in registration with said first opening;

(e) a light carrier movable between an operative position, wherein it prevents entry of light actinic to the sensitized material held by said holder, and an inoperative position, allowing exposure to actinic light of said material; and (f) means preventing movement of said carrier away from said second position when said light barrier is in said inoperative position.

9. The invention according to claim 8 wherein said light barrier comprises an opaque member mounted between said second holder and said third opening and slidably movable between said operative and said inoperative positions.

10. The invention according to claim 9 wherein the last-named means comprises a recess in said camera back and a member on said carrier urged into engagement with said recess when said carrier is in said second position and said light barrier is in said inoperative position.

11. The invention according to claim 10 wherein a portion of said member is contacted by said light barrier when in said operative position and held thereby in a position out of engagement with said recess.

12. A photographic apparatus comprising, in combination:

(a) a camera back having a first opening therein;

(b) a carrier having second and third openings therein and mounted upon said back for movement between a first position, wherein said second opening is in registration with said first opening, and a second position, wherein said third opening is in registration with said first opening;

(c) means for mounting in covering relation to said second opening a focusing panel of the type movable away from said second opening to allow insertion of a first sensitized material holder between said focusing panel and said carrier;

(d) means for mounting a second sensitized material holder in covering relation to said third opening;

(e) an objective lens operably connected to said camera back in registration with said opening;

(f) exposure control means movable between covering and uncovering positions with respect to said lens;

(g) coupling means movable between first and second positions and operably connected to said exposure control means whereby, when said coupling means is moved to its first position said exposure control means is moved to said uncovering position and when said coupling means is moved to its second position said exposure control means is moved to said covering position;

(h) interlock means movable to a position blocking said insertion of said first sensitized material holder in response to movement of said coupling means to said first position;

(i) a light barrier movable between an operative position, wherein it prevents entry of light actinic to a sensitized material held by said second holder, and in inoperative position allowing exposure to actinic light of said material; and (j) means preventing movement of said carrier away from said second position when said light barrier is in said inoperative position.

13. Photographic apparatus comprising, in combination:

(a) a camera back having a first opening therein;

(b) a carrier having second and third openings therein and mounted upon said back for movement between a first position, wherein said second opening is in registration with said first opening, and a second position, wherein said third opening is in registration with said first opening;

(c) means for mounting a focusing panel in covering relation to said second opening;

(d) means for mounting a sensitized material holder in covering relation to said third opening;

(e) an objective lens operably connected to said camera back in registration with said first opening;

(f) exposure control means movable between covering and uncovering position with respect to said lens;

(g) coupling means movable between first and second positions and operably connected to said exposure control means whereby, when said coupling means is moved to its first position said exposure control means is moved to its uncovering position and when said coupling means is moved to its second position said exposure control means is moved to its covering position;

(h) engaging means for releasably locking said carrier in its first and second positions;

(i) release means manually movable to unlock said engaging means to allow movement of said carrier between its first and second positions; and (j) means for so connecting said release means and said exposure control means that the latter is moved to its covering position in response to movement of said release means to unlock said engaging means.

14. Photographic apparatus comprising, in combination:

(a) a camera back having a first opening therein;

(b) a carrier having second and third openings therein and mounted upon said back for movement between a first position, wherein said second opening is in registration with said first opening, and a second position, wherein said third opening is in registration with said first opening;

(c) means for mounting in covering relation to said second opening a focusing panel of the type movable away from said opening to allow insertion of a first sensitized material holder between said focusing panel and said second opening;

(d) means for mounting a second sensitized material holder in covering relation to said third opening;

(e) an objective lens operably connected to said camera back in registration with said first opening;

(f) exposure control means movable between covering and uncovering positions with respect to said lens;

(g) coupling means movable between first and second positions and operably connected to said exposure control means whereby, when said coupling means is moved to its first position said exposure control means is moved to its uncovering position and when said coupling means is moved to its second position said second exposure control means is moved to its covering position;

(h) engaging means for releasably locking said carrier in its first and second positions;

(i) release means manually movable to unlock said engagement means to allow movement of said carrier between its first and second positions;

(j) interlock means movable to an operative position in response to movement of the coupling means to its first position and to an inoperative position in response to movement of said coupling means towards said second position;

(k) said interlock means being so constructed and arranged relative to said second opening that when said interlock means is in said operative position it prevents said insertion of said first sensitized material holder; and (l) means for so connecting said release means with said exposure control means and said interlock means that said interlock means is moved to said inoperative position and said exposure control means is moved to said covering position in response to movement of said release means to unlock said engaging means.

15. Photographic apparatus comprising, in combination:

(a) a camera back having an opening therein;

(b) means for mounting in covering relation to said opening a focusing panel of the type movable away from said opening to allow insertion of a sensitized material holder between said focusing panel and said camera back;

(c) a light barrier movable between opening and closed positions with respect to said opening;

(d) coupling means movable between first and second positions and operably connected to said light barrier whereby, when said coupling means is moved to said first position said light barrier is moved to said open position and when said coupling means is moved to said second position said light barrier is moved to said closed position;

(e) spring means biasing said coupling means toward said second position;

(f) latch means for releasably retaining said coupling means in said first position;

(g) interlock means movable to an operative position in response to movement of said coupling means to said first position into an inoperative position in response to movement of said coupling means to said second position;

(h) said interlock means being so constructed and arranged relative to said camera back and focusing panel that when said interlock means is in said operative position it prevents said insertion of said sensitized material holder;

(i) release means movable to release said latch means from engagement with said coupling means; and (j) means for so connecting said release means with said interlock means that the latter is moved to said inoperative position in response to movement of said release means to release said latch means.

16. Photographic apparatus comprising, in combination:

(a) a camera back having a first opening therein;

(b) a carrier having a second opening therein and mounted upon said camera back for movement between a first position, wherein said second opening is in registration with said first opening, and a second position, wherein said second opening is not in registration with said first opening;

(c) means for mounting a sensitized material holder in covering relation to said second opening;

(d) an objective lens operably connected to said camera back in registration with said first opening;

(e) exposure control means movable between covering and uncovering position with respect to said lens;

(f) a light barrier movable between an operative position, wherein it prevents entry of light actinic to a sensitized material held by said holder, and an inoperative position allowing exposure to actinic light of said material;

(g) first engaging means for releasably locking said carrier in its first and second positions;

(h) release means manually movable to unlock said first engaging means to allow movement of said carrier between its first and second positions;

(i) second engaging means for releasably locking said carrier in said first position in response to movement of said light barrier to said inoperative position when said barrier is in its second position; and (j) means for so connecting said release means and said exposure control means that the latter is moved to its covering position in response to movement of said release means to unlock said first engaging means.

References Cited in the file of this patent
UNITED STATES PATENTS

| | | |
|---|---|---|
| 520,290 | Barker | May 22, 1894 |
| 1,857,706 | Zabrocki | May 10, 1932 |
| 2,112,449 | Proudfit | Mar. 29, 1938 |
| 2,397,742 | Kals | Apr. 2, 1946 |
| 2,842,026 | Reese | July 8, 1958 |